United States Patent
Park et al.

(10) Patent No.: US 10,043,462 B2
(45) Date of Patent: Aug. 7, 2018

(54) DISPLAY APPARATUS AND METHOD OF DRIVING THE DISPLAY APPARATUS

(71) Applicant: Samsung Display Co., LTD., Yongin, Gyeonggi-Do (KR)

(72) Inventors: Su-Hyeong Park, Gyeongju-si (KR); Kyoung-Won Lee, Seoul (KR); Sang-Mi Kim, Yongin-si (KR); Ji-Myoung Seo, Suwon-si (KR); Hyun-Dae Lee, Hwaseong-si (KR); Ho-Yong Jung, Seongnam-si (KR); Hee-Soon Jeong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 567 days.

(21) Appl. No.: 14/573,359

(22) Filed: Dec. 17, 2014

(65) Prior Publication Data
US 2016/0005368 A1 Jan. 7, 2016

(30) Foreign Application Priority Data
Jul. 4, 2014 (KR) ........................ 10-2014-0083989

(51) Int. Cl.
*G09G 3/36* (2006.01)
*G02F 1/133* (2006.01)

(52) U.S. Cl.
CPC ....... *G09G 3/3614* (2013.01); *G02F 1/13306* (2013.01); *G09G 3/3611* (2013.01); *G09G 2320/0204* (2013.01); *G09G 2320/0247* (2013.01); *G09G 2320/103* (2013.01); *G09G 2340/0435* (2013.01); *G09G 2360/16* (2013.01)

(58) Field of Classification Search
CPC ............... G09G 3/3614; G09G 3/3275; G09G 3/3685–3/3692; G09G 230/0254; G09G 2310/0243–2310/0294
See application file for complete search history.

(56) References Cited

U.S. PATENT DOCUMENTS

| | | | | |
|---|---|---|---|---|
| 6,229,515 B1 * | 5/2001 | Itoh | ...................... | G09G 3/3648 345/100 |
| 2011/0170009 A1 * | 7/2011 | Uemura | ............... | G09G 3/3611 348/598 |
| 2015/0287372 A1 * | 10/2015 | Suyama | ............... | G09G 3/3611 345/87 |

FOREIGN PATENT DOCUMENTS

| | | | |
|---|---|---|---|
| KR | 1020080102960 A | 11/2008 | |
| KR | 1020120139743 A | 12/2012 | |

(Continued)

*Primary Examiner* — William Boddie
*Assistant Examiner* — Jeffrey A Parker
(74) *Attorney, Agent, or Firm* — Cantor Colburn LLP

(57) ABSTRACT

A display apparatus includes an image analyzer that analyzes image data and outputs an interrupt signal at a period during which the image data of a low frequency change to the image data of a high frequency, a frequency detector that detects the high frequency, a frame rate controller that outputs a vertical synch signal of the high frequency in response to the interrupt signal, a polarity compensation controller that determines a last frame of the low frequency based on an interrupt period at which the interrupt signal is generated, generates a reversed polarity signal with respect to a polarity signal of the last frame and outputs the reversed polarity signal during a polarity compensation period close to the interrupt period, and a data driver circuit that outputs a data signal based on the reversed polarity signal to a data line during the polarity compensation period.

20 Claims, 6 Drawing Sheets

(56) References Cited

FOREIGN PATENT DOCUMENTS

| KR | 1020130066076 A | 6/2013 |
| KR | 1020150059385 | 6/2015 |

* cited by examiner

DISPLAY APPARATUS AND METHOD OF DRIVING THE DISPLAY APPARATUS

This application claims priority to Korean Patent Application No. 10-2014-0083989 filed on Jul. 4, 2014, and all the benefits accruing therefrom under 35 U.S.C. § 119, the content of which in its entirety is herein incorporated by reference.

BACKGROUND

1. Field

Exemplary embodiments of the invention relate to a display apparatus and a method of driving the display apparatus. More particularly, exemplary embodiments of the invention relate to a display apparatus with improved display quality and a method of driving the display apparatus.

2. Description of the Related Art

Generally, a liquid crystal display ("LCD") apparatus has a relatively small thickness, light weight and low power consumption. Thus, the LCD apparatus is widely used in various devices, e.g., monitors, laptop computers and cellular phones, etc. The LCD apparatus typically includes an LCD panel for displaying images using a selectively changeable light transmittance characteristic of a liquid crystal therein and a backlight assembly disposed under the LCD panel for providing light to the LCD panel. The LCD apparatus may further include a driving circuit that drives the LCD panel and thereby controls the selective changes of the light transmittance characteristic of the liquid crystals.

The LCD panel may be driven an inversion driving mode to improve a display defect that may occur due to accumulated direct current ("DC") of a single polarity. In the inversion driving mode, a data voltage of a current frame image has a reversed polarity with respect to a data voltage of a previous frame.

In the LCD apparatus, a static image may be displayed with a low frequency lower than a high frequency of a moving image to decrease power consumption.

SUMMARY

In a liquid crystal display ("LCD") apparatus driven an inversion driving mode, when a static image is displayed with a low frequency lower than a high frequency of a moving image to decrease power consumption, a low frame rate of the low frequency is longer than a high frame rate of the high frequency and thus, time intervals of two adjacent frames having opposite polarities become different from each other during a frequency change. Therefore, when the frequency is changed, a luminance difference between the low frequency and the high frequency may occur, and a display defect, such as a flicker, may occur by the luminance difference.

Exemplary embodiments of the invention provide a display apparatus with improved display quality.

Exemplary embodiments of the invention provide a method of driving the display apparatus.

According to an exemplary embodiment of the invention, a display apparatus includes an image analyzer configured to analyze image data and to output an interrupt signal at a period during which the image data of a low frequency change to the image data of a high frequency, a frequency detector configured to detect the high frequency changed from the low frequency, a frame rate controller configured to output a vertical synch signal of the high frequency in response to the interrupt signal, a polarity compensation controller configured to determine a last frame of the image data of the low frequency based on an interrupt period at which the interrupt signal is generated, to generate a reversed polarity signal with respect to a polarity signal of the last frame and to output the reversed polarity signal during a polarity compensation period defined to be close to the interrupt period, and a data driver circuit configured to output a data signal having a polarity corresponding to the reversed polarity signal to a data line of a display panel of the display apparatus during the a polarity compensation period.

In an exemplary embodiment, the display apparatus may further include a gate driver circuit configured to drive a gate line of the display panel, where the data driver circuit and the gate driver circuit may output the data signal and a gate signal, respectively, to the display panel with the high frequency in response to the vertical synch signal of the high frequency after the interrupt period.

In an exemplary embodiment, when the interrupt period is at an end portion of the low frequency frame, the low frequency frame including the interrupt period may be determined as the last frame, and the data driver circuit may outputs the data signal to the data line of the display panel with the high frequency based on the reversed polarity signal during the polarity compensation period defined directly next to the last frame.

In an exemplary embodiment, when the interrupt period is at a period which is temporally spaced by the polarity compensation period from an initial portion of a low frequency frame, a previous low frequency frame prior to the low frequency frame including the interrupt period may be determined as the last frame, and the data driver circuit may output the data signal to the data line of the display panel with the low frequency based on the reversed polarity signal during the polarity compensation period, which starts from the initial portion of the low frequency frame.

In an exemplary embodiment, when the interrupt period is at a period which is temporally spaced by a period shorter than the polarity compensation period from an initial portion of a low frequency frame, a previous low frequency frame prior to the low frequency frame including the interrupt period may be determined as the last frame, and the data driver circuit may output the data signal to the data line of the display panel with the low frequency based on the reversed polarity signal during a first period of the polarity compensation period before the interrupt period.

In an exemplary embodiment, the data driver circuit may output the data signal to the data line of the display panel with the high frequency based on the reversed polarity signal during a second period of the polarity compensation period after the interrupt period.

In an exemplary embodiment, when the interrupt period is at a period which is temporally spaced by a period shorter than the polarity compensation period from an end portion of a low frequency frame, the low frequency frame including the interrupt period may be determined as the last frame, and the data driver circuit may output the data signal to the data line of the display panel with the high frequency based on the polarity signal of the low frequency frame from the interrupt period to the end portion of the low frequency frame.

In an exemplary embodiment, the data driver circuit may output the data signal to the data line of the display panel with the high frequency based on the reversed polarity signal during the polarity compensation period defined directly next to the last frame.

In an exemplary embodiment, a low frequency frame including the interrupt period may be determined as the last frame, the polarity compensation period may start form an initial portion of the last frame, and a duration of the polarity compensation period may be preset based on a driving period which is from an initial portion of the last frame to the interrupt period.

In an exemplary embodiment, the polarity compensation period may be shorter than the driving period.

According to an exemplary embodiment of the invention, a method of driving a display apparatus includes outputting an interrupt signal based on image data at a period during which the image data of a low frequency change to the image data of a high frequency, detecting the high frequency changed from the low frequency, outputting a vertical synch signal of the high frequency in response to the interrupt signal, outputting a reversed polarity signal with respect to a polarity signal of a last frame of the image data of the low frequency during a polarity compensation period defined to be close to an interrupt period at which the interrupt signal is generated, and outputting a data signal having a polarity corresponding to the reversed polarity signal to a data line of a display panel of the display apparatus during the polarity compensation period.

In an exemplary embodiment, the method may further include outputting the data signal to the data line of the display panel with the high frequency in response to the vertical synch signal of the high frequency after the interrupt period, and outputting a gate signal to a gate line of the display panel with the high frequency in response to the vertical synch signal of the high frequency after the interrupt period.

In an exemplary embodiment, the method may further include determining a low frequency frame including the interrupt period as the last frame, when the interrupt period is at an end portion of the low frequency frame, where the data signal may be output to the data line of the display panel with the high frequency based on the reversed polarity signal during the polarity compensation period defined directly next to the last frame.

In an exemplary embodiment, the method may further include determining a previous low frequency frame prior to a low frequency frame including the interrupt period as the last frame, when the interrupt period is at a period which is temporally spaced by the polarity compensation period from an initial portion of the low frequency frame, where the data signal may be output to the data line of the display panel with the low frequency based on the reversed polarity signal during the polarity compensation period, which starts from the initial portion of the low frequency frame.

In an exemplary embodiment, the method may further include determining a previous low frequency frame prior to a low frequency frame including the interrupt period as the last frame, when the interrupt period is at a period which is temporally spaced by a period shorter than the polarity compensation period from an initial portion of the low frequency frame, where the data signal may be output to the data line of the display panel with the low frequency based on the reversed polarity signal during a first period of the polarity compensation period before the interrupt period.

In an exemplary embodiment, the data signal may be output to the data line of the display panel with the high frequency based on the reversed polarity signal during a second period of the polarity compensation period after the interrupt period.

In an exemplary embodiment, the method may further include determining the low frequency frame including the interrupt period as the last frame, when the interrupt period is at a period which is temporally spaced by a period shorter than the polarity compensation period from an end portion of the low frequency frame, where the data signal may be output to the data line of the display panel with the high frequency based on the polarity signal of the low frequency frame from the interrupt period to the end portion of the low frequency frame.

In an exemplary embodiment, the data signal may be output to the data line of the display panel with the high frequency based on the reversed polarity signal during the polarity compensation period defined directly next to the last frame.

In an exemplary embodiment, the method may further include determining the low frequency frame including the interrupt period as the last frame, where the polarity compensation period may start from an initial portion of the last frame and a duration of the polarity compensation period is preset based on a driving period which is from an initial portion of the last frame to the interrupt period.

In an exemplary embodiment, the polarity compensation period may be shorter than the driving period.

According to exemplary embodiments of the invention, the display panel displays the moving image of the high frequency with the reversed polarity with respect to the last frame of the low frequency during a predetermined time duration, e.g., the polarity compensation period. Thus, when the frequency is changed, an image may be effectively prevented from being damaged and direct current ("DC") voltage of the display panel may be effectively prevented from being non-uniform.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
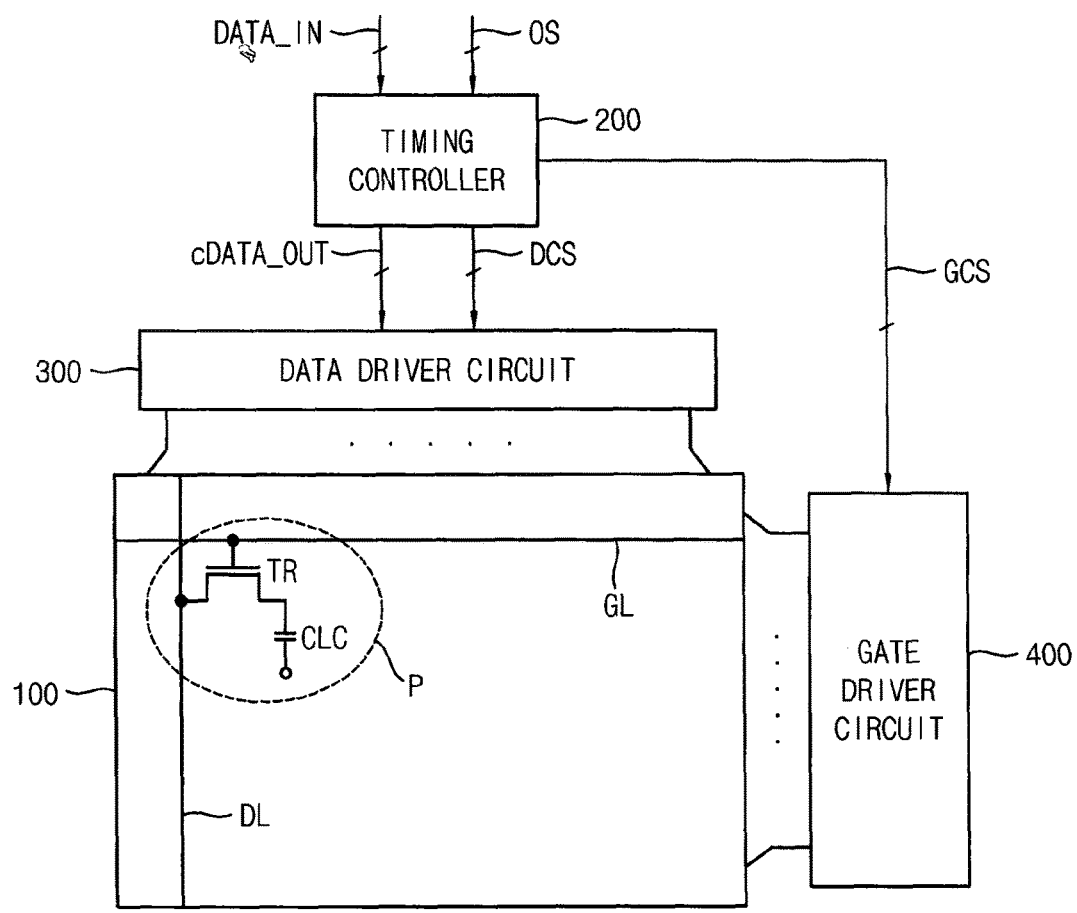
FIG. 1 is a plan view illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

FIG. 1 is a plan view illustrating an exemplary embodiment of a display apparatus according to the invention.

Referring to FIG. 1, an exemplary embodiment of the display apparatus may include a display panel 100, a timing controller 200, a data driver circuit 300 and a gate driver circuit 400.

The display panel 100 may include a plurality of data lines DL, a plurality of gate lines GL and a plurality of sub pixels P.

The plurality of data lines DL extends substantially in a first direction D1 and is arranged in a second direction D2 crossing the first direction D1.

The plurality of gate lines GL extends substantially in the second direction D2 and is arranged in the first direction D1.

The plurality of sub pixels P is arranged substantially in a matrix form including a plurality of sub pixel rows and a plurality of sub pixel columns. Each of the sub pixels P may include a switching element TR which is connected to a corresponding data line of the data lines DL and a corresponding gate line of the gate lines GL and a liquid crystal capacitor CLC which is connected to the switching element TR. The sub pixels P may include a plurality of sub pixels corresponding to primary colors, e.g., red, green and blue sub pixels.

The timing controller 200 may control a driving of the display apparatus.

The timing controller 200 receives image data DATA_IN and an original synch signal OS.

The timing controller 200 is configured to compensate the image data DATA_IN using a compensation algorithm, e.g., at least one of various compensation algorithms, and to provide the data driver circuit 300 with compensated correction data cDATA_OUT. The various compensation algorithms may include an algorithm compensating for a response time, an algorithm compensating for a full white, an algorithm compensating for a gamma luminance and so on, for example.

The timing controller 200 is configured to analyze the image data DATA_IN corresponding to a static image or a moving image. When the image data DATA_IN corresponds to the static image, the timing controller 200 drives the display panel 100 with a low frequency, and when the image data DATA_IN corresponds to the a moving image, the timing controller 200 drives the display panel 100 with a high frequency. A driving frequency of the display panel 100 may be adjusted based on the image data DATA_IN and thus, power consumption of the display apparatus may be decreased when the static image is displayed on the display panel 100.

In an exemplary embodiment, the timing controller 200 is configured to display a changed image on the display panel 100 with a changed frequency from a changing period at which the frequency is changed, to determine a polarity compensation period adjacent or close to the changing period, to control a polarity of a data signal applied to the display panel 100 to be a reversed polarity with respect to a polarity of a previous frame, which is prior to the polarity compensation period, during the polarity compensation period. Thus, in such an embodiment, when the frequency is changed, an image may be effectively prevented from being damaged, and a direct current ("DC") voltage of the display panel may be effectively prevented from being non-uniform.

The timing controller 200 is configured to generate a plurality of driving control signals to drive the display panel 100 based on the original synch signal OS. The plurality of driving control signals may include a data control signal DCS that is transmitted to the data driver circuit 300 and a gate driving control signal GCS that is transmitted to the gate driver circuit 400.

The data control signal DCS may include a horizontal synch signal, a vertical synch signal, a data enable signal, a polarity signal POL and so on, for example.

The gate control signal GCS may include a vertical start signal STV (shown in FIG. 4), a gate clock signal, an output enable signal and so on, for example.

The data driver circuit 300 is configured to convert the correction data cDATA_OUT received from the timing controller 200 to a data voltage using a gamma voltage based on the data control signal DCS and to output the data voltage to the data lines DL of the display panel 100.

The gate driver circuit 400 is configured to generate a plurality of gate signals based on the gate control signal, and to sequentially output the plurality of gate lines GL with the plurality of gate signals. The gate driver circuit 400 may have a single gate structure which provides a single end portion of a gate line with the gate signal or a dual gate structure which concurrently provides two end portions of a gate line with a same gate signal.

Figure 2:
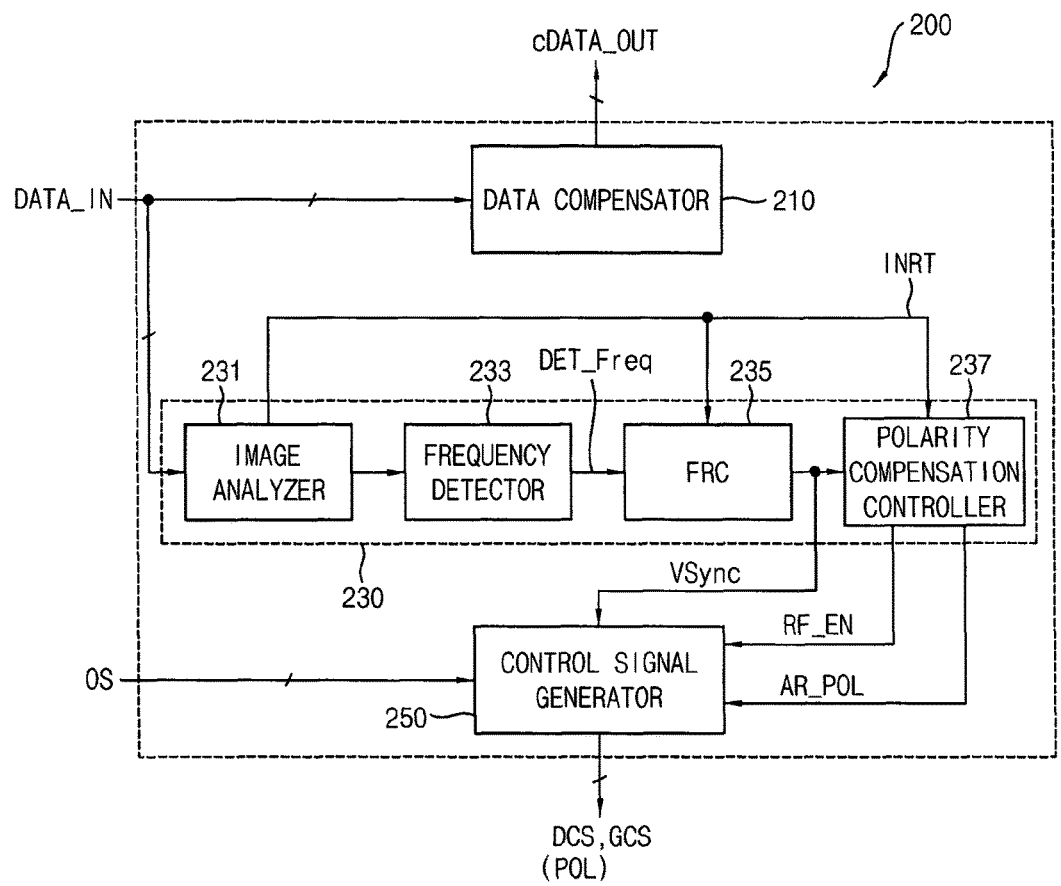
FIG. 2 is a block diagram illustrating an exemplary embodiment of a timing controller of FIG. 1.
Figure 3:
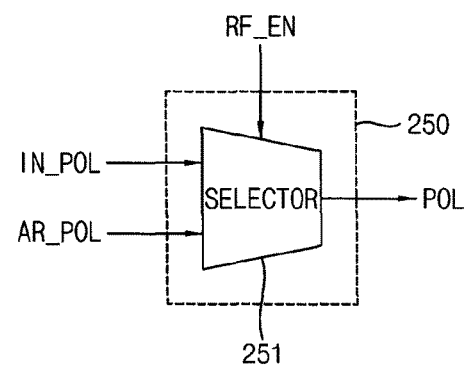
FIG. 3 is conceptual diagram illustrating an exemplary embodiment of a control signal generator of FIG. 2.

FIG. 2 is a block diagram illustrating an exemplary embodiment of the timing controller of FIG. 1. FIG. 3 is conceptual diagram illustrating an exemplary embodiment of a control signal generator of FIG. 2.

Referring to FIGS. 1 and 2, the timing controller 200 may include a data compensator 210, a polarity adjustor 230 and a control signal generator 250.

The data compensator 210 is configured to compensate the image data DATA_IN using a compensation algorithm, e.g., at least one of the various compensation algorithms, and to output correction data cDATA_OUT. The various compensation algorithms may include an algorithm compensating for a response time, an algorithm compensating for a full white, an algorithm compensating for a gamma luminance and so on, for example.

In an exemplary embodiment, the polarity adjustor 230 is configured to analyze an input image, to generate a vertical synch signal VSync for driving the display panel 100 during a period starting from the changing period, at which the frequency of the input image is changed, based on the changed frequency. The polarity adjustor 230 is configured to determine the polarity compensation period to be adjacent or close to the changing period, and to generate a compensation enable signal RF_EN and a reversed polarity signal AR_POL, which compensate a polarity of a last frame prior to frequency change.

The control signal generator 250 is configured to generate the data control signal DCS and the gate driving control signal GCS based on the original synch signal OS. The data control signal DCS controls a driving of the data driver circuit 300, and the gate driving control signal GCS controls a driving of the gate driver circuit 400. The data control signal DCS may include the horizontal synch signal, the vertical synch signal, the data enable signal, data clock signal, the polarity signal POL and so on, for example. The gate control signal GCS may include the vertical start signal STV, the gate clock signal, the output enable signal and so on, for example.

In one exemplary embodiment, for example, the polarity adjustor 230 may include an image analyzer 231, a frequency detector 233, a frame rate controller (referred to as "FRC" in FIG. 2) 235 and a polarity compensation controller 237.

In such an embodiment, the image analyzer 231 is configured to analyze the image data DATA_IN and to determine whether the image data DATA_IN is changed from the static image of the low frequency to the moving image of the high frequency or from the moving image of the high frequency to the static image of the low frequency. The image analyzer 231 is configured to generate an interrupt signal INRT in synchronization with the changing period at which the low frequency is changed to the high frequency or the high frequency is changed to the low frequency, and to provide the polarity compensation controller 237 with the interrupt signal INRT.

Figure 4:
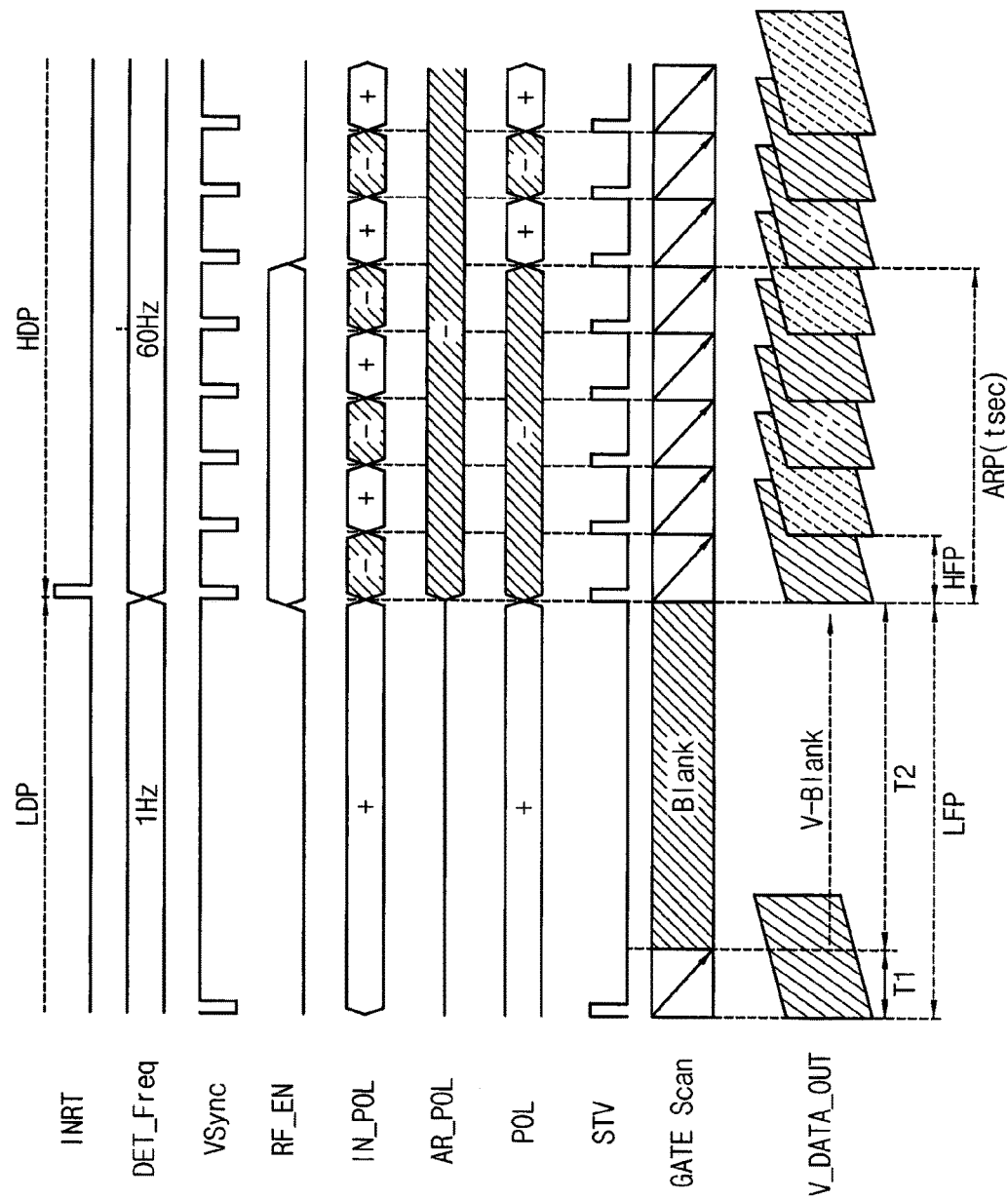
FIG. 4 is a waveform diagram illustrating an exemplary embodiment of a method of driving the display apparatus of FIG. 1.

The frequency detector 233 is configured to detect a changed frequency DET_Freq (shown in FIG. 4).

The frame rate controller 235 is configured to generate the vertical synch signal VSync having a frame rate corresponding to the changed frequency DET_Freq. The vertical synch signal VSync is applied to the control signal generator 250.

The polarity compensation controller 237 is configured to generate the compensation enable signal RF_EN corresponding to the polarity compensation period ARP based on the vertical synch signal VSync and the interrupt signal INRT. A temporal length or time interval of the polarity compensation period ARP may correspond to a predetermined duration tsec (shown in FIG. 4). A high period of the compensation enable signal RF_EN having a high level may be variously set based on an interrupt period at which the interrupt signal INRT is generated.

In one exemplary embodiment, for example, the high period of the compensation enable signal RF_EN may overlap the polarity compensation period which starts next to (e.g., immediately after) the last frame of a low frequency determined based on the interrupt signal. In an alternative exemplary embodiment, the high period of the compensation enable signal RF_EN may overlap the polarity compensation period which is variably set based on the interrupt period.

The polarity compensation controller 237 is configured to provide the control signal generator 250 with the compensation enable signal RF_EN.

The polarity compensation controller 237 is configured to determine the last frame of previous frequency (e.g., the frequency before the frequency change) based on the interrupt period, at which the interrupt signal INRT is generated, to generate a reversed polarity signal AR_POL, which is reversed to the polarity of the last frame of the previous frequency, and to provide the control signal generator 250 with the reversed polarity signal AR_POL.

Referring to FIG. 3, the control signal generator 250 may include a selector 251. The selector 251 is configured to receive the compensation enable signal RF_EN as a control signal thereof, an inner polarity signal IN_POL, which is generated from an inside of the control signal generator 250, and the reversed polarity signal AR_POL, which is generated from the polarity compensation controller 237, as an input signal thereof.

The selector 251 is configured to select and output one of the inner polarity signal IN_POL and the reversed polarity signal AR_POL in response to the compensation enable signal RF_EN as the polarity signal POL of the data control signal DCS. The polarity signal POL output from the selector 251 is applied to the data driver circuit 300 to control the polarity of the data voltage applied to the data lines DL.

In one exemplary embodiment, for example, when the compensation enable signal RF_EN is at a high level, the selector 251 outputs the reversed polarity signal AR_POL as the polarity signal POL. In such an embodiment, when the compensation enable signal RF_EN is at a low level, the selector 251 outputs the inner polarity signal IN_POL as the polarity signal POL.

Hereinafter, an exemplary embodiment of a method of driving the display apparatus when the static image of the low frequency is changed to the moving image of the static image will be described in detail.

FIG. 4 is a waveform diagram illustrating an exemplary embodiment of a method of driving the display apparatus of FIG. 1.

Referring to FIGS. 1 to 4, the display apparatus may display the static image of the low frequency. In one exemplary embodiment, for example, the static image of 1 hertz (Hz) is displayed on the display apparatus.

During an early first period T1 of the low frequency frame LFP, the data driver circuit 300 outputs a frame data signal of the static image to the display panel 100 (V_DATA_OUT). During the early first period T1 of the low frequency frame LFP, the gate driver circuit 400 sequentially outputs a plurality of gate signals to the display panel 100 (GATE SCAN).

During a latter second period T2 of the low frequency frame LFP, the data driver circuit 300 does not output the data signal and holds the frame data signal output in the early first period T1 (V_DATA_OUT). In the latter second period T2, the gate driver circuit 400 does not output the plurality of gate signals (GATE SCAN: Blank).

In such an embodiment, as described above, the display panel 100 displays the static image during a low frequency period LDP.

Then, the timing controller 200 receives image data DATA_IN corresponding to the moving image of the high frequency during a high frequency period HDP.

The image analyzer 231 analyzes the image data DATA_IN, determines the changing period at which the low frequency frame LFP is changed to a high frequency frame HFP, and generates an interrupt signal INRT in synchronization with the changing period. The interrupt signal INRT may be applied to the frame rate controller 235 and the polarity compensation controller 237.

The frequency detector 233 detects the high frequency that is, the changed frequency, corresponding to the moving image DET_Freq. In one exemplary embodiment, for example, the high frequency corresponding to the moving image is 60 Hz.

The frame rate controller 235 generates the vertical synch signal VSync having a frame rate corresponding to the high frequency of 60 Hz. The vertical synch signal VSync may be applied to the polarity compensation controller 237 and the control signal generator 250.

The polarity compensation controller 237 generates the compensation enable signal RF_EN of the high level based on the vertical synch signal VSync and the interrupt signal INRT. The polarity compensation period ARP may be determined based on the high level of the compensation enable signal RF_EN. The polarity compensation period ARP may have the predetermined duration tsec.

The data driver circuit 300 outputs a plurality of frame data signals corresponding to the moving image to the display panel 100 in synchronization with the vertical synch signal VSync of the high frequency (V_DATA_OUT).

The gate driver circuit 400 outputs a plurality of gate signals to the display panel 100 in response to a vertical start signal STV in synchronization with the vertical synch signal VSync of the high frequency (GATE SCAN).

The selector 251 outputs the reversed polarity signal AR_POL as the polarity signal POL in response to the compensation enable signal RF_EN of the high level during the polarity compensation period ARP. During the polarity compensation period ARP, the display panel 100 is driven by the data signal of the moving image having the polarity based on the reversed polarity signal AR_POL.

In a period after the polarity compensation period ARP, the selector 251 outputs the inner polarity signal IN_POL as the polarity signal POL in response to the compensation enable signal RF_EN of the low level. Thus, in such a period after the polarity compensation period ARP, the display panel 100 is driven by the data signal of the moving image having the polarity based on the inner polarity signal IN_POL.

According to an exemplary embodiment, during the polarity compensation period ARP, the display panel is driven by the reversed polarity (+) with respect to the polarity (−) of the last frame based on the interrupt signal INRT such that the polarity of the DC voltage of the display panel may be compensated. In such an embodiment, during the polarity compensation period ARP, the display panel continuously displays the image without stopping image and thus, the image may be effectively prevented from being damaged.

Hereinafter, the polarity compensation period in various exemplary embodiments of the invention will be described in detail.

Figure 5:
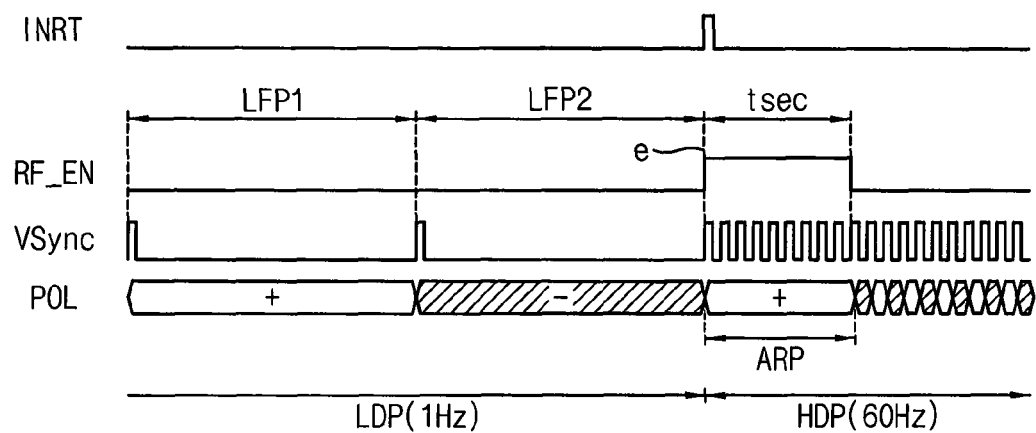
FIG. 5 is a waveform diagram illustrating an exemplary embodiment of a method of driving the display apparatus according to the invention.

FIG. 5 is a waveform diagram illustrating an exemplary embodiment of a method of driving the display apparatus according to the invention.

Referring to FIG. 5, in an exemplary embodiment, the interrupt signal INRT may be generated at an interrupt period in synchronization with the changing period, at which the static image of the low frequency is changed to the moving image of the high frequency.

In such an embodiment, when the interrupt period at which the interrupt signal INRT is generated is at an end portion (e.g., an end time point) 'e' of a second low frequency frame LFP2 after a first low frequency frame LFP1, the polarity adjustor 230 determines the second low frequency frame LFP2 including the interrupt period as the last frame of the low frequency.

The polarity adjustor 230 generates a vertical synch signal VSync of the high frequency during a period starting from the interrupt period corresponding to the end portion 'e' of the second low frequency frame LFP2 in response to the interrupt signal INRT.

The data driver circuit outputs a data signal of the moving image to the data line of the display panel based on the vertical synch signal VSync of the high frequency and the polarity signal POL. The gate driver circuit generates a plurality of gate signals based on the vertical synch signal VSync of the high frequency and outputs the plurality of gate signals to the gate lines of the display panel.

The polarity adjustor 230 generates a compensation enable signal RF_EN of the high level during the period starting form the end portion 'e' of the second low frequency frame LFP2 and thus, the polarity compensation period ARP is determined based on a high period of the compensation enable signal RF_EN having the high level.

The polarity adjustor 230 generates a reversed polarity signal (+) with respect to a polarity signal (−) of the second low frequency frame LFP2 that is the last frame of the low frequency.

The control signal generator 250 provides the data driver circuit 300 with the reversed polarity signal (+) during the polarity compensation period ARP based on the high level of the compensation enable signal RF_EN.

Thus, the data driver circuit outputs the data signal of the moving image based on the reversed polarity signal (+) to the data line of the display panel during the polarity compensation period ARP which starts from the end portion of the second low frequency frame LFP2.

Accordingly, in such an embodiment, the display panel displays the moving image of the high frequency with the reversed polarity with respect to the last frame of the low frequency during the polarity compensation period ARP. Thus, when the frequency is changed, an image may be effectively prevented from being damaged and a direct DC voltage of the display panel may be effectively prevented from being non-uniform.

Figure 6:
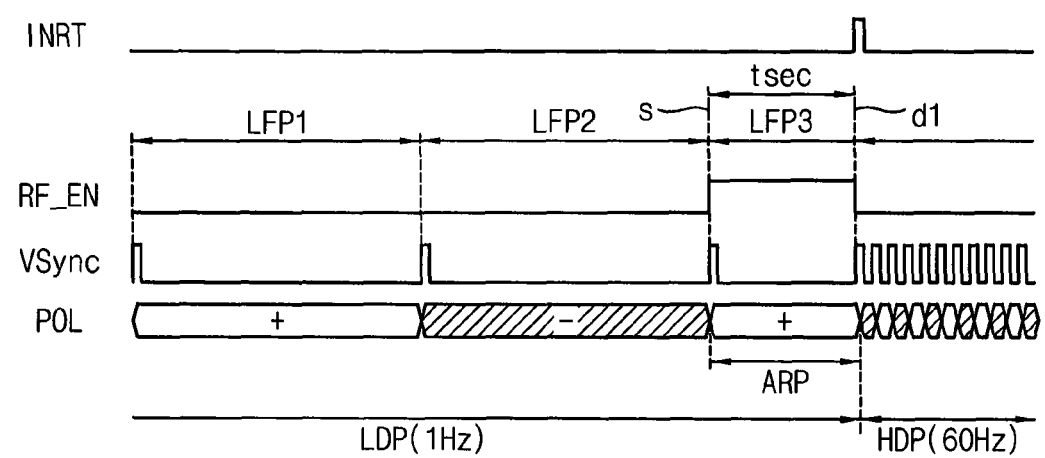
FIG. 6 is a waveform diagram illustrating an alternative exemplary embodiment of a method of driving the display apparatus according to the invention.

FIG. 6 is a waveform diagram illustrating an alternative exemplary embodiment of a method of driving the display apparatus according to the invention.

Referring to FIG. 6, in an exemplary embodiment, the interrupt signal INRT is generated at an interrupt period in synchronization with the changing period, at which the static image of the low frequency is changed to the moving image of the high frequency.

In such an embodiment, when the interrupt period, at which the interrupt signal INRT is generated, is at a period d1 temporally spaced by the polarity compensation period ARP (e.g., after a duration of the polarity compensation period ARP) from an initial portion of a third low frequency frame LFP3, the polarity adjustor 230 determines the second low frequency frame LFP2 prior to the third low frequency frame LFP3 including the interrupt period as the last frame of the low frequency.

The polarity adjustor 230 generates a vertical synch signal VSync of the high frequency during a period starting from the portion d1 of the third low frequency frame LFP3 in response to the interrupt signal INRT.

The data driver circuit outputs a data signal of the moving image to the data line of the display panel based on the vertical synch signal VSync of the high frequency and the polarity signal POL. The gate driver circuit generates a plurality of gate signals based on the vertical synch signal VSync of the high frequency and outputs the plurality of gate signals to the gate lines of the display panel.

According to an exemplary embodiment, as described above, the interrupt signal INRT is generated at the period d1 temporally spaced by the polarity compensation period ARP from an initial portion of the third low frequency frame LFP3, and thus, the polarity adjustor 230 generates a compensation enable signal RF_EN of the high level during a period starting from the initial portion 's' of the third low frequency frame LFP3 and thus, the polarity compensation period ARP is determined based on a high period of the compensation enable signal RF_EN having the high level.

The polarity adjustor 230 generates a reversed polarity signal (+) with respect to a polarity signal (−) of the second low frequency frame LFP2 that is the last frame of the low frequency.

The control signal generator 250 provides the data driver circuit 300 with the reversed polarity signal (+) during the polarity compensation period ARP based on the high level of the compensation enable signal RF_EN.

According to an exemplary embodiment, the interrupt signal INRT is generated in an early period of the third low frequency frame LFP3 next to the second low frequency frame LFP2 that is determined as the last frame, and thus, the polarity compensation period ARP is defined in the third low frequency frame LFP3. During the polarity compensation period ARP, the data driver circuit outputs the data signal of the static image based on the reversed polarity signal (+) to the data line of the display panel.

Accordingly, in such an embodiment, the display panel displays the static image of the low frequency with the reversed polarity with respect to the last frame of the low frequency during the polarity compensation period ARP. Thus, when the frequency is changed, an image may be effectively prevented from being damaged and a DC voltage of the display panel may be effectively prevented from being non-uniform.

Figure 7:
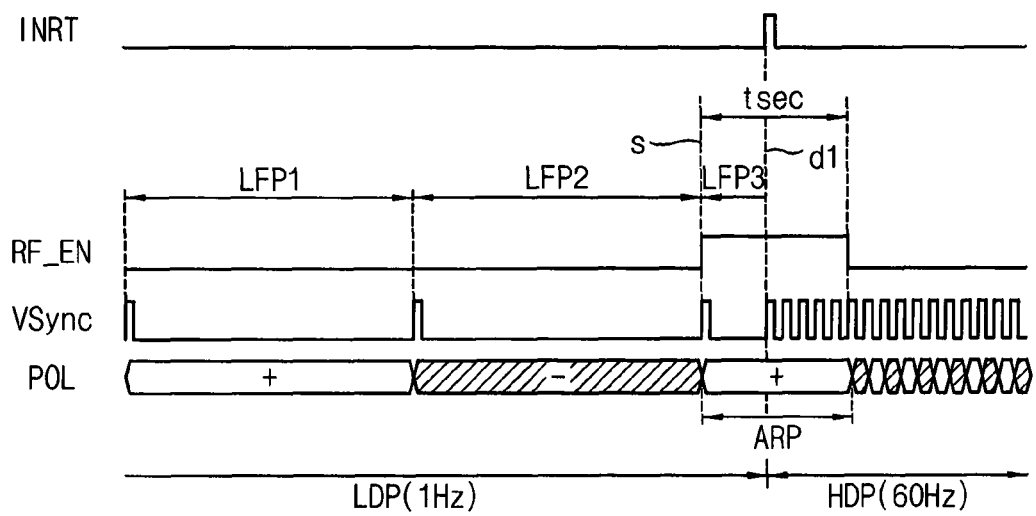
FIG. 7 is a waveform diagram illustrating another alternative exemplary embodiment of a method of driving the display apparatus according to the invention.

FIG. 7 is a waveform diagram illustrating another alternative exemplary embodiment of a method of driving the display apparatus according to the invention.

Referring to FIG. 7, in an exemplary embodiment, the interrupt signal INRT is generated at an interrupt period in synchronization with the changing period, at which the static image of the low frequency is changed to the moving image of the high frequency.

In such an embodiment, when the interrupt period at which the interrupt signal INRT is generated is at a period d1 which is temporally spaced by a period shorter than the polarity compensation period ARP (e.g., a duration shorter than a duration of the polarity compensation period ARP) from an initial portion (e.g., an initial time point) 's' of a third low frequency frame LFP3, the polarity adjustor 230 determines the second low frequency frame LFP2 prior to the third low frequency frame LFP3 including the interrupt period as the last frame of the low frequency.

The polarity adjustor 230 generates a vertical synch signal VSync of the high frequency during a period starting from the period d1 in the third low frequency frame LFP3 in response to the interrupt signal INRT.

The data driver circuit outputs a data signal of the moving image to the data line of the display panel based on the vertical synch signal VSync of the high frequency and the polarity signal POL. The gate driver circuit generates a plurality of gate signals based on the vertical synch signal VSync of the high frequency and outputs the plurality of gate signals to the gate lines of the display panel.

According to an exemplary embodiment, as described above, the interrupt signal INRT is generated is at the period d1 which is temporally spaced by a period shorter than the polarity compensation period ARP from an initial portion 's' of a third low frequency frame LFP3, and thus, the polarity adjustor 230 generates a compensation enable signal RF_EN of the high level during a period starting from the initial portion 's' of the third low frequency frame LFP3.

The polarity adjustor 230 generates a reversed polarity signal (+) with respect to a polarity signal (−) of the second low frequency frame LFP2 that is the last frame of the low frequency.

The control signal generator 250 provides the data driver circuit 300 with the reversed polarity signal (+) during the polarity compensation period ARP based on the high level of the compensation enable signal RF_EN.

According to an exemplary embodiment, the interrupt signal INRT is generated in an early period of the third low frequency frame LFP3 next to the second low frequency frame LFP2 that is determined as the last frame, and thus, the polarity compensation period ARP is defined in the third low frequency frame LFP3.

In such an embodiment, the interrupt signal INRT is generated during the polarity compensation period ARP. Thus, during a first period of the polarity compensation period ARP before the interrupt signal INRT, the data driver circuit outputs the data signal of the static image based on the reversed polarity signal (+) to the data line of the display panel. Then, during a second period of the polarity compensation period ARP after the interrupt signal INRT, the data driver circuit outputs the data signal of the moving image based on the reversed polarity signal (+) to the data line of the display panel.

Accordingly, in such an embodiment, the display panel displays the static image of the low frequency and the moving image of the high frequency with the reversed polarity with respect to the last frame of the low frequency during the polarity compensation period ARP. Thus, when the frequency is changed, an image may be effectively prevented from being damaged, and a DC voltage of the display panel may be effectively prevented from being non-uniform.

Figure 8:
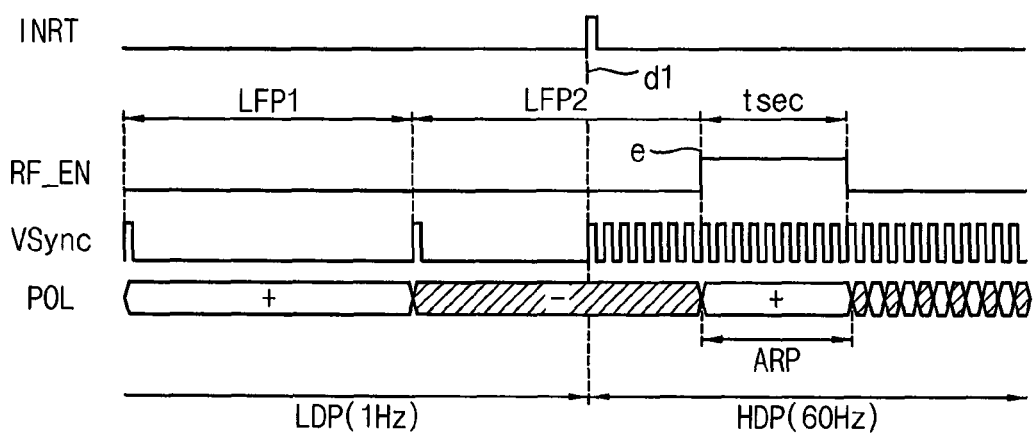
FIG. 8 is a waveform diagram illustrating another alternative exemplary embodiment of a method of driving the display apparatus according to the invention.

FIG. 8 is a waveform diagram illustrating another alternative exemplary embodiment of a method of driving the display apparatus according to the invention.

Referring to FIG. 8, in an exemplary embodiment, the interrupt signal INRT is generated at an interrupt period in synchronization with the changing period, at which the static image of the low frequency is changed to the moving image of the high frequency.

In such an embodiment, when the interrupt period at which the interrupt signal INRT is generated is at a period d1 which is temporally spaced by a period shorter than the polarity compensation period ARP from an end portion 'e' of a second low frequency frame LFP2, the polarity adjustor 230 determines the second low frequency frame LFP2 including the interrupt period as the last frame of the low frequency.

The polarity adjustor 230 generates a vertical synch signal VSync of the high frequency during a period starting from the period d1 in the second low frequency frame LFP2 in response to the interrupt signal INRT.

The data driver circuit outputs a data signal of the moving image to the data line of the display panel based on the vertical synch signal VSync of the high frequency and the polarity signal POL. The gate driver circuit generates a plurality of gate signals based on the vertical synch signal VSync of the high frequency and outputs the plurality of gate signals to the gate lines of the display panel.

According to an exemplary embodiment, as described above, the interrupt signal INRT is generated is at the period d1 which is temporally spaced by a period shorter than the polarity compensation period ARP from an end portion 'e' of a second low frequency frame LFP2, and thus, the polarity adjustor 230 generates a compensation enable signal RF_EN of the high level during a period starting from the end portion 'e' of the second low frequency frame LFP2.

The polarity adjustor 230 generates a reversed polarity signal (+) with respect to a polarity signal (−) of the second low frequency frame LFP2 that is the last frame of the low frequency.

The control signal generator 250 provides the data driver circuit 300 with the reversed polarity signal (+) during the polarity compensation period ARP based on the high level of the compensation enable signal RF_EN.

Accordingly, in such an embodiment, the display panel displays the moving image of the high frequency with the reversed polarity with respect to the last frame of the low frequency during the polarity compensation period ARP. Thus, when the frequency is changed, an image may be effectively prevented from being damaged, and a DC voltage of the display panel may be effectively prevented from being non-uniform.

Figure 9:
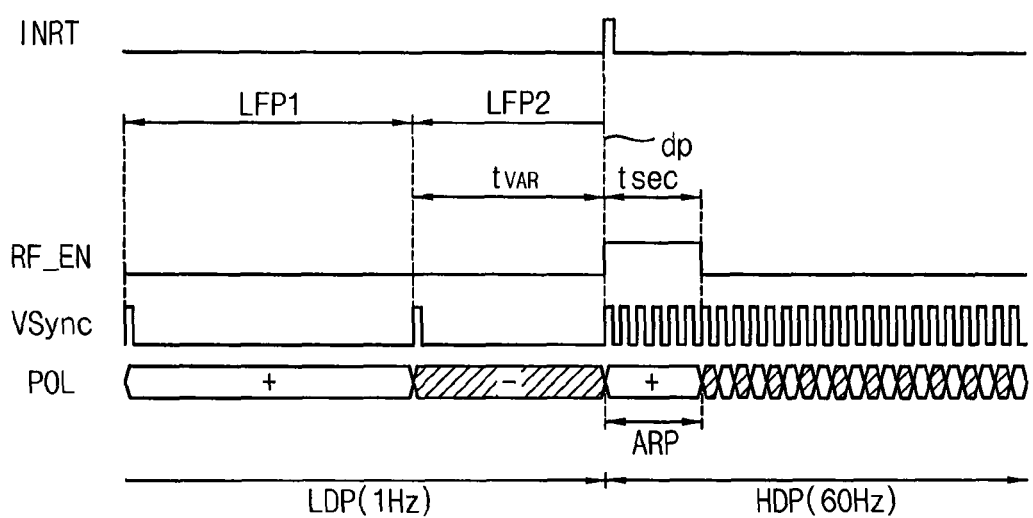
FIG. 9 is a waveform diagram illustrating another alternative exemplary embodiment of a method of driving the display apparatus according to the invention.

FIG. 9 is a waveform diagram illustrating another alternative exemplary embodiment of a method of driving the display apparatus according to the invention.

Referring to FIG. 9, in an exemplary embodiment, the interrupt signal INRT is generated at an interrupt period in synchronization with the changing period at which the static image of the low frequency is changed to the moving image of the high frequency.

In such an embodiment, when the interrupt signal INRT is generated at a time point dp in the second low frequency frame LEP2, the polarity adjustor 230 determines the second low frequency frame LFP2 as the last frame of the low frequency.

The polarity adjustor 230 generates a vertical synch signal VSync of the high frequency during a period starting from the time point dp in the second low frequency frame LFP2 in response to the interrupt signal INRT.

The data driver circuit outputs a data signal of the moving image to the data line of the display panel based on the vertical synch signal VSync of the high frequency and the polarity signal POL. The gate driver circuit generates a plurality of gate signals based on the vertical synch signal VSync of the high frequency, and outputs the plurality of gate signals to the gate lines of the display panel.

The polarity compensation controller 237 generates a proportional constant corresponding to a variable period tvar, which is from an initial portion of the second low frequency frame LFP2 to the time point dp of the second low frequency frame LFP2 with respect to the second low frequency frame LFP2, and thus, a duration tsec of a polarity compensation period ARP is determined based on the proportional constant. Here, the proportional constant is an integer less than 1.

In one exemplary embodiment, for example, when the proportional constant is '0.5', the polarity compensation controller 237 determines half of the variable period tvar as the temporal length or the duration tsec of the polarity compensation period ARP. The polarity compensation controller 237 generates the compensation enable signal RF_EN corresponding to the polarity compensation period ARP. In one exemplary embodiment, for example, the compensation enable signal RF_EN has a high level during the polarity compensation period ARP as shown in FIG. 9.

The polarity adjustor 230 generates a reversed polarity signal (+) with respect to a polarity signal (−) of the second low frequency frame LFP2 based on the compensation enable signal RF_EN.

As described above, according to an exemplary embodiment, the proportional constant is applied to the variable period tvar in the last frame of a previous frequency determined based on the interrupt signal and thus, the duration tsec of the polarity compensation period ARP may be determined or preset.

Accordingly, in such an embodiment, the display panel displays the moving image of the high frequency with the reversed polarity with respect to the last frame of the low frequency during the polarity compensation period ARP. Thus, when the frequency is changed, an image may be effectively prevented from being damaged, and a DC voltage of the display panel may be effectively prevented from being non-uniform.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
    an image analyzer configured to analyze image data and to output an interrupt signal at a period during which an image data of a low frequency changes to an image data of a high frequency;
    a frequency detector configured to detect the high frequency changed from the low frequency;
    a frame rate controller configured to output a vertical synch signal of the high frequency in response to the interrupt signal;
    a polarity compensation controller configured to determine a last frame of the image data of the low frequency based on an interrupt period at which the interrupt signal is generated, to generate a reversed polarity signal with respect to a polarity signal of the last frame and to output the reversed polarity signal during a polarity compensation period defined to be close to the interrupt period; and
    a data driver circuit configured to output a data signal having a polarity corresponding to the reversed polarity signal to a data line of a display panel of the display apparatus during the polarity compensation period,
    wherein, during a low frequency period before the polarity compensation period, the display panel is driven based on the image data of the low frequency and an inversion driving mode in which a polarity is regularly reversed for each low frequency frame,
    wherein, during the polarity compensation period, the display panel is driven by a reversed polarity with respect to a polarity of the last frame and continuously displays images without stopping image,
    wherein, during a high frequency period after the polarity compensation period, the display panel is driven based on the image data of the high frequency and an inversion driving mode in which a polarity is regularly reversed for each high frequency frame,
    wherein the polarity compensation period is shorter than a period of each low frequency frame and longer than a period of each high frequency frame.

2. The display apparatus of claim 1, further comprising:
    a gate driver circuit configured to drive a gate line of the display panel,
    wherein the data driver circuit and the gate driver circuit output the data signal and a gate signal, respectively, to the display panel with the high frequency in response to the vertical synch signal of the high frequency after the interrupt period.

3. The display apparatus of claim 1, wherein
    when the interrupt period is at an end portion of a low frequency frame, the low frequency frame including the interrupt period is determined as the last frame, and
    the data driver circuit outputs the data signal to the data line of the display panel with the high frequency based on the reversed polarity signal during the polarity compensation period defined directly next to the last frame.

4. The display apparatus of claim 1, wherein
    when the interrupt period is at a period which is temporally spaced by the polarity compensation period from an initial portion of a low frequency frame, a previous low frequency frame prior to the low frequency frame including the interrupt period is determined as the last frame, and
    the data driver circuit outputs the data signal to the data line of the display panel with the low frequency based on the reversed polarity signal during the polarity compensation period, which starts from the initial portion of the low frequency frame.

5. The display apparatus of claim 1, wherein
    when the interrupt period is at a period which is temporally spaced by a period shorter than the polarity compensation period from an initial portion of a low frequency frame, a previous low frequency frame prior to the low frequency frame including the interrupt period is determined as the last frame, and
    the data driver circuit outputs the data signal to the data line of the display panel with the low frequency based on the reversed polarity signal during a first period of the polarity compensation period before the interrupt period.

6. The display apparatus of claim 5, wherein the data driver circuit outputs the data signal to the data line of the display panel with the high frequency based on the reversed polarity signal during a second period of the polarity compensation period after the interrupt period.

7. The display apparatus of claim 1, wherein
    when the interrupt period is at a period which is temporally spaced by a period shorter than the polarity compensation period from an end portion of a low frequency frame, the low frequency frame including the interrupt period is determined as the last frame, and
    the data driver circuit outputs the data signal to the data line of the display panel with the high frequency based on the polarity signal of the low frequency frame from the interrupt period to the end portion of the low frequency frame.

8. The display apparatus of claim 7, wherein the data driver circuit outputs the data signal to the data line of the display panel with the high frequency based on the reversed polarity signal during the polarity compensation period defined directly next to the last frame.

9. The display apparatus of claim 1, wherein
a low frequency frame including the interrupt period is determined as the last frame,
the polarity compensation period starts from an initial portion of the last frame, and
a duration of the polarity compensation period is preset based on a driving period which is from an initial portion of the last frame to the interrupt period.

10. The display apparatus of claim 9, wherein the polarity compensation period is shorter than the driving period.

11. A method of driving a display apparatus, the method comprising:
outputting an interrupt signal based on image data at a period during which an image data of a low frequency changes to an image data of a high frequency;
detecting the high frequency changed from the low frequency;
outputting a vertical synch signal of the high frequency in response to the interrupt signal;
outputting a reversed polarity signal with respect to a polarity signal of a last frame of the image data of the low frequency during a polarity compensation period defined to be close to an interrupt period at which the interrupt signal is generated; and
outputting a data signal having a polarity corresponding to the reversed polarity signal to a data line of a display panel of the display apparatus during the polarity compensation period,
wherein, during a low frequency period before the polarity compensation period, the display panel is driven based on the image data of the low frequency and an inversion driving mode in which a polarity is regularly reversed for each low frequency frame,
wherein, during the polarity compensation period, the display panel is driven by a reversed polarity with respect to a polarity of the last frame and continuously displays images without stopping image,
wherein, during a high frequency period after the polarity compensation period, the display panel is driven based on the image data of the high frequency and an inversion driving mode in which a polarity is regularly reversed for each high frequency frame,
wherein the polarity compensation period is shorter than a period of each low frequency frame and longer than a period of each high frequency frame.

12. The method of claim 11, further comprising:
outputting the data signal to the data line of the display panel with the high frequency in response to the vertical synch signal of the high frequency after the interrupt period; and
outputting a gate signal to a gate line of the display panel with the high frequency in response to the vertical synch signal of the high frequency after the interrupt period.

13. The method of claim 11, further comprising:
determining a low frequency frame including the interrupt period as the last frame, when the interrupt period is at an end portion of the low frequency frame,
wherein the data signal is output to the data line of the display panel with the high frequency based on the reversed polarity signal during the polarity compensation period defined directly next to the last frame.

14. The method of claim 11, further comprising:
determining a previous low frequency frame prior to a low frequency frame including the interrupt period as the last frame, when the interrupt period is at a period which is temporally spaced by the polarity compensation period from an initial portion of the low frequency frame,
wherein the data signal is output to the data line of the display panel with the low frequency based on the reversed polarity signal during the polarity compensation period, which starts from the initial portion of the low frequency frame.

15. The method of claim 11, further comprising:
determining a previous low frequency frame prior to a low frequency frame including the interrupt period as the last frame, when the interrupt period is at a period which is temporally spaced by a period shorter than the polarity compensation period from an initial portion of the low frequency frame,
wherein the data signal is output to the data line of the display panel with the low frequency based on the reversed polarity signal during a first period of the polarity compensation period before the interrupt period.

16. The method of claim 15, wherein the data signal is output to the data line of the display panel with the high frequency based on the reversed polarity signal during a second period of the polarity compensation period after the interrupt period.

17. The method of claim 11, further comprising:
determining a low frequency frame including the interrupt period as the last frame, when the interrupt period is at a period which is temporally spaced by a period shorter than the polarity compensation period from an end portion of the low frequency frame,
wherein the data signal is output to the data line of the display panel with the high frequency based on the polarity signal of the low frequency frame from the interrupt period to the end portion of the low frequency frame.

18. The method of claim 17, wherein the data signal is output to the data line of the display panel with the high frequency based on the reversed polarity signal during the polarity compensation period defined directly next to the last frame.

19. The method of claim 17, further comprising:
determining a low frequency frame including the interrupt period as the last frame,
wherein the polarity compensation period starts from an initial portion of the last frame and a duration of the polarity compensation period is preset based on a driving period which is from an initial portion of the last frame to the interrupt period.

20. The method of claim 19, wherein the polarity compensation period is shorter than the driving period.

* * * * *